United States Patent
Shade et al.

(10) Patent No.: US 10,435,780 B2
(45) Date of Patent: Oct. 8, 2019

(54) LOW CTE SLUSH MOLDS WITH TEXTURED SURFACE, AND METHOD OF MAKING AND USING THE SAME

(75) Inventors: Matthew Martin Shade, Whitehouse, OH (US); Grigoriy Grinberg, Sylvania, OH (US)

(73) Assignee: Genius Solutions Engineering Company, Sylvania, OH (US)

( * ) Notice: Subject to any disclaimer, the term of this patent is extended or adjusted under 35 U.S.C. 154(b) by 853 days.

(21) Appl. No.: 13/377,291

(22) PCT Filed: Jun. 11, 2010

(86) PCT No.: PCT/US2010/038291
§ 371 (c)(1),
(2), (4) Date: Feb. 23, 2012

(87) PCT Pub. No.: WO2010/144786
PCT Pub. Date: Dec. 16, 2010

(65) Prior Publication Data
US 2012/0139160 A1    Jun. 7, 2012

Related U.S. Application Data (60) Provisional application No. 61/268,369, filed on Jun. 11, 2009.

(51) Int. Cl.
*B29C 41/18* (2006.01)
*C23C 8/02* (2006.01)
(Continued)

(52) U.S. Cl.
CPC ............ *C23C 8/02* (2013.01); *B29C 33/02* (2013.01); *B29C 33/424* (2013.01);
(Continued)

(58) Field of Classification Search
CPC ...................................................... B29C 41/18
See application file for complete search history.

(56) References Cited

U.S. PATENT DOCUMENTS 4,434,189 A  *  2/1984  Zaplatynsky ................. 427/556
5,049,354 A     9/1991  Nishimura et al.
(Continued)

FOREIGN PATENT DOCUMENTS

| CA | 2532497 A1 | 7/2007 |
| CN | 101379210 A | 3/2009 |

(Continued)

OTHER PUBLICATIONS

Rahn et al., "The Effect of a Nitride Layer on the Texturability of Steels for Plastic Moulds" (Year: 2002).*
(Continued)

*Primary Examiner* — Ryan M Ochylski
(74) *Attorney, Agent, or Firm* — MacMillan, Sobanski & Todd, LLC (57) ABSTRACT

A rotomolding tool having a textured surface is provided. The tool comprises a shell having a body portion and an upper mold surface having a grain texture, at least the body portion comprising a nickel-iron alloy having a coefficient of thermal expansion of at most $5.0 \times 10^{-6}$ in/in/° F. at temperatures between 100° and 500° F.

18 Claims, 4 Drawing Sheets

(51) Int. Cl.
  B29C 33/02    (2006.01)
  B29C 33/42    (2006.01)
  B29C 33/56    (2006.01)
  B29C 41/38    (2006.01)
  B29C 41/46    (2006.01)
  C23C 8/24     (2006.01)
  C23C 8/26     (2006.01)
  C23C 2/12     (2006.01)
  C23C 2/28     (2006.01)
  B29C 33/04    (2006.01)
  B29L 31/30    (2006.01)

(52) U.S. Cl.
  CPC ............ *B29C 33/565* (2013.01); *B29C 41/18* (2013.01); *B29C 41/38* (2013.01); *B29C 41/46* (2013.01); *C23C 2/12* (2013.01); *C23C 2/28* (2013.01); *C23C 8/24* (2013.01); *C23C 8/26* (2013.01); *B29C 2033/042* (2013.01); *B29L 2031/3005* (2013.01)

(56) References Cited

U.S. PATENT DOCUMENTS

| | | | |
|---|---|---|---|
| 5,407,487 A * | 4/1995 | Weber et al. | 118/728 |
| 5,688,471 A * | 11/1997 | Smith | C22C 38/08 420/581 |
| 5,817,267 A * | 10/1998 | Covino et al. | 264/219 |
| 6,447,704 B1 * | 9/2002 | Covino | 264/219 |
| 6,699,419 B1 | 3/2004 | Kia et al. | |
| 2003/0127775 A1 * | 7/2003 | McDonald | 264/338 |
| 2004/0113322 A1 | 6/2004 | Grimmer et al. | |
| 2005/0274438 A1 * | 12/2005 | Hasek | C22C 38/08 148/336 |
| 2008/0241296 A1 | 10/2008 | Wang et al. | |
| 2009/0047167 A1 | 2/2009 | Gehrmann et al. | |
| 2010/0175847 A1 | 7/2010 | Gehrmann et al. | |

FOREIGN PATENT DOCUMENTS

| | | | | |
|---|---|---|---|---|
| DE | 10052951 A1 * | 5/2002 | ............ | B29C 33/56 |
| EP | 0368565 A1 | 5/1990 | | |
| JP | 04263909 | 9/1992 | | |
| JP | 06172919 A | 6/1994 | | |
| JP | 6172919 A | 6/1994 | | |
| JP | 07276392 A | 10/1995 | | |
| JP | 08267476 A * | 10/1996 | | |
| JP | 09165653 A | 6/1997 | | |
| JP | 2940692 B * | 8/1999 | | |
| KR | 2008005767 A | 6/2008 | | |
| WO | WO-9412679 A1 * | 6/1994 | ............ | C23C 8/36 |
| WO | WO 2007087786 A1 * | 8/2007 | | |

OTHER PUBLICATIONS

Strumilova et al., "Combined Aluminizing with Nitriding Process of Structural and Tool Steels in a Low-Pressure Arc Discharge Plasma" (Year: 2004).*

Bindumadhavan et al., "Aluminizing and subsequent nitriding of plain carbon low alloy steels for piston ring applications" (Year: 2000).*

Screenshot showing 2002 date of the 6th Internaional Tooling Conference.*

Screenshot showing 2004 date of the 7th International Conference on Modification of Materials.*

Japanese Notice of Rejection dated Jul. 29, 2014, Application No. 2012-515176, Dispatch No. 412065, 2 Pages.

PCT International Search Report dated Jan. 12, 2011, Applicant Genisus Solutions Engineering Company et al., Application No. PCT/US2010/038291.

Chinese Office Action dated Jun. 4, 2013, Application No. 201080025908.8.

Extended European Search Report dated Feb. 25, 2016, Application No. 10786903.4-1373 / 2440681 PCT/US2010038291, Applicant Ford Motor Company, 7 Pages.

EP Communication pursuant to Article 94(3), Application No. 10786903.4, dated Nov. 14, 2017.

EP Communication pursuant to Article 94(3), Application No. 10786903.4, dated Jul. 30, 2018.

Spiekermann, "Alloys—a special problem of patent law", Nonpublised English Translation of Document, pp. 1-20.

* cited by examiner

LOW CTE SLUSH MOLDS WITH TEXTURED SURFACE, AND METHOD OF MAKING AND USING THE SAME

CROSS-REFERENCE TO RELATED APPLICATION

This application is the U.S. national phase of PCT Appln. No. PCT/US2010/038291 filed Jun. 11, 2010 which claims the benefit of U.S. provisional application Ser. No. 61/268,369 filed Jun. 11, 2009, the disclosures of which are incorporated in their entirety by reference herein.

TECHNICAL FIELD

The present invention relates to molds useable for slush molding made of a material with a low coefficient of thermal expansion in the molding temperature range. The present invention also relates to methods of making and using the molds.

BACKGROUND

In at least one embodiment, the present invention is used for slush molding parts for use in the automotive industry. Slush molding is commonly utilized in the automotive industry to produce "class A" interior skins, which are used in the automobile interior, such as for instrument and door panels. A typical slush molding process involves casting a charge of powder polymeric material against a heated mold surface to form a molded part or skin with a desired shape and texture. Other processes that utilize a similar type of heated mold surface are commonly referred to as roto-molds, rotational molds and powder forming molds.

Depending upon the process and type of the part required, the polymeric material can be liquid or powder. In molding processes where powder polymeric material is used, the mold is heated to melt the polymeric material and cooled to cure the polymeric material. In processes where liquid polymeric material is used, the mold is heated to cure the polymeric material and cooled to remove the part.

The molded part may be made by attaching and sealing an open upper end of a charge box to an outer rim of an open end of the mold. The charge box is then inverted to allow the polymeric material within the charge box to fall by gravity from the charge box and onto the heated mold surface. Once polymeric material is applied to the heated mold surface, the charge box is typically returned to its upright position to allow the excess polymeric material to return to the charge box. The cast material is then allowed to melt on the heated surface. The polymeric material is allowed to solidify before removing it from the mold surface. Additionally, the mold forming surface is typically grained or textured to produce the desired skin surface texture.

A typical construction for a slush mold comprises a self-supported metal shell capable of being heated and cooled. In one particular slush molding application, the mold temperatures can reach up to 500° F. during the melting of the polymeric material. Typically, the mold temperature is controlled by using a system of heated tubes attached to the back of the mold circulating hot oil, however other methods such as hot air, infrared or induction, and heated sand can be utilized to heat the mold. Regardless of the application, the metal shell thickness is typically relatively thin with respect to the mold forming areas to permit rapid heating and cooling of the mold.

Typically, automotive slush molding tools are made of nickel. The nickel molds are typically produced using electro-deposition or vapor-deposition processes. In both cases, nickel is the desired material primarily for grain and texture reproduction, but it also produces mold shells having good corrosion resistance, wear resistance, and release characteristics.

One drawback associated with the use of nickel molds produced in this manner is that the mold can have an unpredictable, and often relatively short life cycle. For instance, nickel molds typically have a life span capable of producing between 1,000 to 80,000 parts, with between 30,000 and 45,000 parts being most typical. Since a relatively typical vehicle program has a production requirement of 400,000 to 1,000,000 parts, it is not uncommon for up to 50 molds to be needed for a program life.

The primary failure mode in nickel shell cast skin tooling is the accumulated residual stresses resulting from thermal cycling. The thermal cycle stress is a result of the material manufacturing process and the CTE (coefficient of thermal expansion) of the material which over time results in a crack in the nickel mold. Cracking can be produced by thermal expansion and contraction producing localized areas of stress due to material properties and thickness variations in the mold. This is due to the non-uniform mold thickness resulting from the manufacturing procedure. Nickel shells are typically manufactured using an electro-deposition or vapor deposition process. During these processes, the sharp points or edges of the mold will build up charge and the shell will therefore be thicker at those locations. These thicker areas will expand at different rates across the mold surface during heating and cooling and this thickness variation can produce stress over time that results in the shell failure. The shell failure is often caused by shell cracking. For instance, in applications utilizing oil to heat nickel shells, the CTE difference between the silver solder, the steel oil tubes, and the nickel shell yields three different CTE's and this mismatch between the three different materials creates stress which can lead to cracking.

As set forth above, the life of a nickel slush mold is relatively unpredictable. Because of the uncertainty of when the mold will fail, and because of the associated cost with downtime on a manufacturing line, molders of automotive parts typically maintain a relatively large number of molds on hand in order to account for and replace broken molds. In addition to the manufacturing downtime associated with replacing broken molds on a molding line and the associated costs with keeping a large number of molds on site in storage, the replacement cost of the molds are relatively expensive, as each tool costs roughly $50,000 to $500,000.

Accordingly, there is a need for a mold that has a longer life than the currently available nickel molds.

SUMMARY

The present invention solves one or more of the problems in the prior art by providing, in at least one embodiment, a slush molding tool with a textured surface, wherein the molding tool comprises a shell having a body portion and an upper mold surface having a grain texture, with the shell being made of a nickel-iron alloy having a coefficient of thermal expansion of no more than $5 \times 10^{-6}$ inch/inch/° F. at temperatures between 100° and 500° F. with the body portion having a Vickers hardness (HV) of at least 100 HV. In at least one embodiment, the nickel-iron alloy has a composition comprising at least 30 wt. % nickel.

In another embodiment, the body has a first hardness value measured in Vickers (HV) and the upper mold surface has a second hardness value, which is a microhardness measured in Knoop microhardness (HK), that is higher than the first hardness value. In at least one embodiment, the microhardness has a value of 350 to 4,000 HK.

In another embodiment, the nickel-iron alloy has a composition comprising at least 30 weight percent nickel, 0.1 weight percent aluminum and 0.25 weight percent chromium. In another embodiment, the nickel-iron alloy has a composition comprising at least 30 weight percent nickel, 0.1 weight percent aluminum, 0.25 weight percent chromium, 0.1 weight percent zirconium, and 0.1 weight percent titanium. In yet another embodiment, the nickel-iron alloy has a composition comprising at least 30 weight percent nickel, and at least one element selected from the group consisting of aluminum, chromium, zirconium, silicon and titanium. In yet another embodiment, the nickel-iron alloy has a composition comprising at least 30 weight percent nickel, 0.3 weight percent aluminum and 0.7 percent weight chromium. In yet another embodiment, the nickel-iron alloy has a composition comprising at least 30 weight percent nickel, at least 1% cobalt, and at least one element selected from the group consisting of aluminum, chromium, zirconium, silicon and titanium.

In still yet another embodiment, the upper mold surface has a coating disposed thereon wherein the coating has a microhardness of 500 to 9,000 HK.

In still yet another embodiment, the shell body has a plurality of molded in temperature controlled channels for providing heated mediums, such as oil, therethrough to heat the shell.

In still yet another embodiment, the shell body has a plurality of fins or grooves on the backside of the shell for providing heated mediums, such as air, therethrough to heat the shell more efficiently.

Additionally, in one aspect of the invention a rotomolding tool is provided having a textured surface, with the tool comprising a shell having a body portion and an upper mold surface having a grain texture, with at least the body portion comprising a nickel-iron alloy having a coefficient of thermal expansion of at most $5.0 \times 10^{-6}$ in/in/° F. at temperatures between 100° and 500° F.

In another aspect, a rotomolding tool is provided having a textured surface, with the tool comprising a shell having a body portion and an upper mold surface having a grain texture, with at least the body portion comprising a nickel-iron alloy having at least 30 wt. % nickel.

In certain aspects, the nickel-iron alloy has a composition comprising at least 30 wt. % nickel. In other aspects, the nickel-iron alloy has a composition comprising at least 30 wt. % nickel, 0.05 wt. % aluminum, and 0.01 wt. % chromium. In yet other aspects, the nickel-iron alloy has a composition comprising at least 30 wt. % nickel, 0.05 to 0.75 wt. % aluminum, and 0.01 to 1.5 wt. % chromium.

In one aspect, the body portion has a first hardness having a Vickers hardness (HV) of at least 100 and the upper surface has a second hardness that is higher than the first hardness and a thickness of at most 1.5 mm. In certain of these aspects, the first hardness is 100 to 350 HV and the second hardness is a microhardness of above 350 Knoop hardness (HK). In certain other of these aspects, the microhardness is 350 to 9,000 HK. In yet certain other of these aspects, the microhardness is 400 to 1,500 HK. In still yet certain other of these aspects, the microhardness is 600 to 1,000 HK. In still yet even certain other of these aspects, the microhardness is 800 to 1,000 HK. In further certain other of these aspects, the microhardness is 500 to 2,000 HK.

In other aspects, the upper surface has a thickness of 0.002 to 1.5 mm. In another aspect, the upper surface has a thickness of 0.4 to 0.6 mm.

In other aspects, the upper mold surface comprises a nickel-iron alloy having a coefficient of thermal expansion of at most $5.0 \times 10^{-6}$ in/in/° F. at temperatures between 100° and 500° F. that has undergone a nitriding treatment. In certain of these aspects, the nitriding treatment is ion nitriding.

In other aspects, the upper mold surface comprises a nickel-iron alloy having a coefficient of thermal expansion of at most $5.0 \times 10^{-6}$ in/in/° F. at temperatures between 100° and 500° F. that has undergone an aluminizing treatment and nitriding treatment.

In other aspects, the upper mold surface comprises a nickel-iron alloy having a coefficient of thermal expansion of $0.1 \times 10^{-6}$ to $4.0 \times 10^{-6}$ in/in/° F. at temperatures between 100° and 500° F.

In other aspects, the upper mold surface comprises a coating. In certain of these aspects, the coating is a nitride coating. In certain other of these aspects, the coating is one of nickel, DLC, chrome, titanium, zirconium or silicon. In yet certain other of these aspects, the coating has a thickness of 0.5 to 25 μm. In still yet certain other of these aspects, the coating has a thickness of 1 to 5 μm. In further certain other of these aspects, the coating has a thickness of 1 to 500 μm.

In other aspects, the tool has a thickness of 3 to 10 mm. In certain of these aspects, the tool has a thickness of 3.5 to 4.5 mm. In certain other of these aspects, the thickness is uniform throughout the tool.

In other aspects, the coefficient of thermal expansion at temperatures between 100° and 500° F. is at most $2.5 \times 10^{-6}$ in/in/° F.

In yet other aspects, the coefficient of thermal expansion at temperatures between 100° and 500° F. is at most $1.5 \times 10^{-6}$ in/in/° F.

In still yet other aspects, the grain texture has a depth of 0.005 to 1.0 mm. In certain of these aspects, the grain texture has a depth of 0.1 to 0.4 mm.

In other aspects, a process of making an automotive interior part molding tool is provided, with the process comprising (a) providing a tool blank of nickel-iron alloy having a coefficient of thermal expansion of at most $5.0 \times 10^{-6}$ in/in/° F. at temperatures between 100° and 500° F.; (b) machining the tool blank to a tool shape having an upper mold surface and an underlying body portion; and (c) creating a grain texture on the upper mold surface.

In other aspects, the process further comprises performing a surface treatment on the upper mold surface to provide a top surface of the tool with a Knoop microhardness that is higher than a Vickers hardness of the body.

In yet other aspects, the nickel-iron alloy has a composition comprising at least 30 wt. % nickel, 0.05 wt. % aluminum, and 0.01 wt. % chromium. In certain of these aspects, the nickel-iron alloy has a composition comprising at least 30 wt. % nickel, 0.05 to 0.75 wt. % aluminum, and 0.2 to 1.5 wt. % chromium.

In other aspects, machining the tool blank includes machining the tool blank with a computed numerically controlled (CNC) machine.

In other aspects, machining the tool blank includes the use of an electrical discharge machine.

In certain aspects, the CNC machining comprises machining on at least 5 axes.

In certain aspects, creating the grain texture comprises acid etching the upper mold surface. In other aspects, creating the grain texture comprises laser etching the upper mold surface.

In certain aspects, the grain texture has a depth of 0.005 to 1.0 mm, and in other aspects, the grain texture has a depth of 0.1 to 0.4 mm.

In certain aspects, the surface treatment comprises ion nitriding the upper mold surface. In other aspects, the surface treatment comprises aluminizing the upper mold surface and then nitriding the upper mold surface.

In other aspects, the surface treatment comprises applying a coating to the upper mold surface. In certain of these aspects, the coating comprises a nitride. In other of these aspects, the coating comprises nickel, DLC, chrome, titanium, zirconium or silicon. In certain other aspects, the coating is applied using electroplating, electroless plating, CVD, or PVD. In at least one aspect, the coating does not affect the grain texture. In other aspects, the surface treatment comprises electroplating nickel or electroless nickel plating at a thickness of 1 to 500 μm onto the upper mold surface.

In at least one aspect, the surface treatment provides the top surface with a Knoop microhardness value of 350 to 4,000 HK. In certain of these aspects, the surface treatment provides the top surface with a Knoop microhardness value of 500 to 2,000 HK, in other aspects, with a Knoop microhardness value of 400 to 1,500 HK, and in yet other aspects with a Knoop microhardness value of 600 to 1,000 HK.

In at least on aspect, the upper mold surface has a thickness of up to 1.5 mm. In other aspects, the upper mold surface has a thickness of 0.2 to 1.0 mm, and in yet other aspects of 0.4 to 0.6 mm.

In certain aspects, the coating has a thickness of 0.5 to 12 μm, and in other aspects, of 1 to 5 μm.

In certain aspects, the shell has a thickness of 3 to 10 mm, and in other aspects of 3.5 to 4.5 mm.

In certain aspects, the thickness of the shell is uniform throughout.

In certain other aspects, the alloy has a coefficient of thermal expansion at temperatures between 100° and 500° F. of at most $2.5 \times 10^{-6}$ in/in/° F., and in yet other aspects, a coefficient of thermal expansion at temperatures between 100° and 500° F. is at most $1.5 \times 10^{-6}$ in/in/° F.

In at least one aspect, a process for making an automotive part is provided, with the process comprising providing any one of the rotomolding tools described above; introducing polymeric material into the tool; heating the tool; allowing the tool to cool to form a polymeric skin; and removing the polymeric skin from the tool.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular aspects or embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
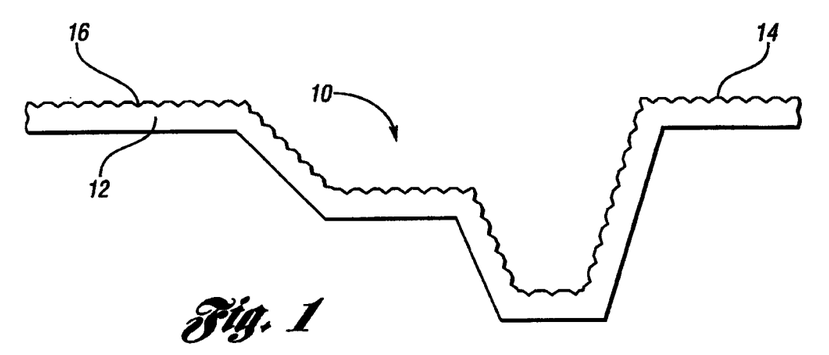
FIG. 1 is a side view of a molding tool in accordance with an embodiment of the present invention.

Referring to FIG. 1, in at least one embodiment, the present invention provides a slush molding tool 10. The slush molding tool 10 has a body portion 12 and an upper mold surface portion 14. In at least one embodiment, the upper mold surface portion 14 has a grained texture, shown schematically as 16. The molding tool 10 is usable in any suitable slush molding process.

In certain embodiments, the grain 16 will have a depth or texture of 5 to 1,000 microns, in other embodiments of 50 to 600 microns, and in yet other embodiments of 100 to 400 microns. While the molding tool 10 can have any suitable thickness, in certain embodiments the mold tool 10 will have an average thickness of 3 to 10 mm and in other embodiments of 3.5 to 4.5 mm with the body portion 12 comprising the majority of the thickness. In one embodiment, the molding tool 10 has a substantially uniform thickness, wherein uniform means that no portion of the tool has a thickness that varies by more than 0.1 mm from any other portion of the tool. In certain embodiments the upper mold surface portion 14 has a thickness of 0.002 to 1.5 mm, in other embodiments of 0.2 to 1.0 mm, and in yet other embodiments of 0.4 to 0.6 mm.

The tool 10 shown in FIG. 1 is schematically illustrated to have a relatively unique shape, however, it should be understood that the shape of the tool 10 in FIG. 1 is for illustrative purposes only and should not be construed to limit the side or shape of the molding tools in accordance with the present invention in any way, shape or form.

In that regard, molding tools 10 of the present invention can be used to make automotive parts of any suitable shape or size. Without being limited, some examples of suitable parts to be made by the tools of the present invention include, but are not limited to instrument panels, door panels, consoles and other parts such as headliners and seats. Typical parts molded from the tools of the present invention are PVC or other suitable polymeric material such as polyurethane, and have thicknesses of 0.5 to 3 mm and have lengths and widths between 2 inches and 8 feet. In some embodiments, the molded parts may have lengths and/or widths of 2 to 6 feet.

The molding tool 10 is made of a material having a low coefficient of thermal expansion (low CTE) in the molding process temperature range. In at least one embodiment, the molding material comprises a nickel-iron alloy having a coefficient of thermal expansion of no more than $5 \times 10^{-6}$ in./in./° F. at temperatures between 100° and 500° F. In another embodiment, the nickel-iron alloy has a coefficient of thermal expansion of $0.1 \times 10^{-6}$ to $4.0 \times 10^{-6}$ in./in./° F. at temperatures between 100° and 500° F., in other embodiments of $0.25 \times 10^{-6}$ to $2.5 \times 10^{-6}$ in./in/° F. at temperatures between 100° and 500° F., and in yet other embodiments of $0.5 \times 10^{-6}$ to $1.5 \times 10^{-6}$ in./in./° F. at temperatures between 100° and 500° F. In at least one embodiment, the nickel-iron alloy has a Vickers hardness of at least 100 HV as measured by ASTM Test Method No. E-384. In other embodiments, the nickel-iron alloy has a Vickers hardness of 200 HV to 350 HV, in other embodiments of 200 to 325 HV and in yet other embodiments of 250 to 300 HV, as measured by ASTM Test Method No. E-384.

While any suitable material can be used to make the molding tool, provided that the resulting tool has a coefficient of thermal expansion of no more than $5 \times 10^{-6}$ in./in./° F. at temperatures between 100° and 500° F. and a Vickers hardness of at least 100, one particularly suitable material comprises a nickel-iron alloy. In one embodiment, the nickel-iron alloy has the following composition:

| Elements | Wt. % |
| --- | --- |
| Nickel | 30-38 wt. % |
| Cobalt | 0-6.0 wt. % |
| Silicon | 0.05-0.3 wt. % |
| Aluminum | 0.05-0.2 wt. % |
| Copper | 0-0.1 wt. % |
| Manganese | 0.3-0.6 wt. % |
| Carbon | 0-0.07 wt. % |
| Sulfur | 0.005-0.03 wt. % |
| Chromium | 0.01-0.4 wt. % |
| Zirconium | 0-0.1 wt. % |
| Titanium | 0-0.1 wt. % |
| Iron | balance |

In another embodiment, the nickel-iron alloy has the following weight percent:

| Elements | Wt. % |
| --- | --- |
| Nickel | 31-37 wt. % |
| Cobalt | 0-5.75 wt. % |
| Silicon | 0.07-0.28 wt. % |
| Aluminum | 0.06-0.1 wt. % |
| Copper | 0-0.09 wt. % |
| Manganese | 0.35-0.55 wt. % |
| Carbon | 0-0.06 wt. % |
| Sulfur | 0.01-0.02 wt. % |
| Chromium | 0.02-0.3 wt. % |
| Zirconium | 0-0.1 wt. % |
| Titanium | 0-0.1 wt. % |
| Iron | balance |

In yet another embodiment, the nickel-iron alloy has the following weight percent:

| Elements | Wt. % |
| --- | --- |
| Nickel | 36 wt. % |
| Silicon | 0.25 wt. % |
| Aluminum | 0.1 wt. % |
| Manganese | 0.5 wt. % |
| Sulfur | 0.02 wt. % |
| Chromium | 0.25 wt. % |
| Zirconium | 0.1 wt. % |
| Titanium | 0.1 wt. % |
| Iron | balance |

While any suitable nickel-iron alloy having the above-identified properties can be used, in at least one embodiment, Invar® has been found to be particularly suitable. Furthermore, Invar® No. 36 and Super Invar® have been found to be particularly suitable and are available from Carpenter company of Wyomissing, Pa.

Figure 2:
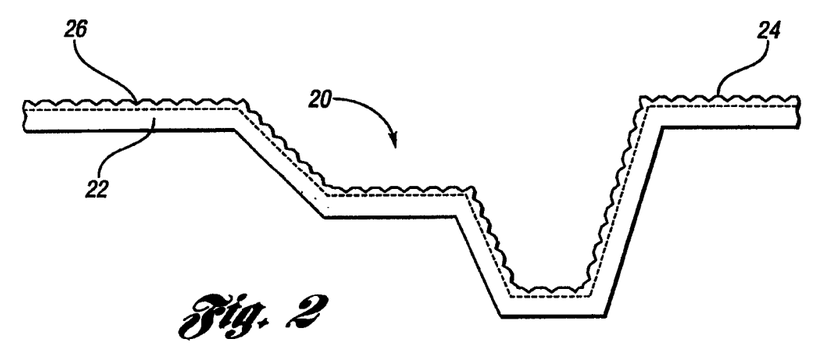
FIG. 2 is a view similar to FIG. 1 illustrating another embodiment of the present invention.

Turning to FIG. 2, in another embodiment, a molding tool 20 is provided having a body portion 22 and an upper mold surface portion 24. Body portion 22 has a composition and properties similar to those of body portion 12 described with reference to FIG. 1. In at least one embodiment, the upper mold surface portion 24 will have graining represented schematically by 26. In certain embodiments, the grain 26 will have a depth or texture of 5 to 1,000 microns, in other embodiments of 50 to 600 microns, and in yet other embodiments of 100 to 400 microns. While the molding tool 20 can have any suitable thickness, in certain embodiments the mold tool 20 will have an average thickness of 3 to 10 mm and in other embodiments of 3.5 to 4.5 mm with the body portion comprising the majority of the thickness. In one embodiment, the molding tool 20 has a substantially uniform thickness, wherein uniform means that no portion of the tool has a thickness that varies by more than 0.1 mm from any other portion of the tool. In certain embodiments the upper mold surface portion 24 has a thickness of 0.002 to 1.5 mm, in other embodiments of 0.2 to 1.0 mm, and in yet other embodiments of 0.4 to 0.6 mm.

In the embodiment illustrated in FIG. 2, the upper mold surface portion 24 has a higher hardness than the hardness of the body portion 22 of the mold tool 20. In this embodiment, the body portion 22 has a Vickers hardness in the range of 100 to 350 as measured by ASTM Test Method No. E-384 and the upper surface portion 24 has a microhardness in the range of 350 to 2,000 HK and in yet other embodiments of 400 to 1,500 HK, in yet other embodiments of 600 to 1,000 HK, and in yet other embodiments of 700 to 900 HK as measured by ASTM Test Method No. E-384. The increased hardness of the upper mold surface portion 24 can be provided by surface treating the upper mold surface portion 24. The upper mold surface 24 is also referred to as a case hardened surface.

The upper mold surface portion 24 can be case hardened by ion nitriding the surface. Ion nitriding is generally known in the art and will not be explained in great detail here. Generally, the tool is exposed to a ion nitriding process to provide the desired hardness of the upper surface portion 24. Generally, the tool 20 is heated and in a chamber with nitrogen being introduced into the chamber. A voltage is biased on the tool 20 to accelerate nitrogen particles toward the tool. When nitrogen particles hit the aluminum, chromium, zirconium, silicon, or titanium in the tool 20, the nitrogen reacts with the element to form aluminum nitride, chromium nitride, zirconium nitride, silicon nitride, or titanium nitride respectively, in the surface of the tool 20. The aluminum nitride, chromium nitride, zirconium nitride, silicon nitride, or titanium nitride have a higher hardness than the nickel-iron alloy that forms the remainder of the body portion 22.

It should be understood that the ion nitride will cause nitride formation that extends or diffuses somewhat into the body of the tool, such as up to 1.5 mm into the body. The hardness of the nitrided portion of the tool 20 will decrease as the case hardening depth extends further into the body portion 22 such that typically the hardest portion of the tool will be just at the upper mold surface 24 of the tool 20. In that regard, when mentioning microhardness of the upper mold surface portion 24 of the tool 20, it should be understood that the measurements are being taken just at the upper mold surface and that the entire nitrided portion of the molding tool does not necessarily have the same hardness as that of the upper surface and thus the present invention and claims are not to be limited as such. It should also be understood that those experienced in the art of nitriding can incorporate other elements such as carbon during nitriding to produce nitride materials such as titanium carbo nitride (TiCN) and silicon carbide (SiC). In some embodiments, a substantial portion or the entire body surface will be subjected to the nitriding process, resulting in case hardening of a substantial portion or the entire body surface, not just the upper mold surface.

In one embodiment, the nickel-iron alloy has a higher level of nitriding elements, such as aluminum, chromium, zirconium, silicon, and/or titanium to provide even yet a harder surface portion to the tool. In this embodiment, the nickel-iron alloy has the following composition:

| Elements | Wt. % |
| --- | --- |
| Nickel | 30-38 wt. % |
| Cobalt | 0-6.0 wt. % |
| Silicon | 0.05-0.3 wt. % |
| Aluminum | 0.05-0.75 wt. % |
| Copper | 0-0.1 wt. % |
| Manganese | 0.3-0.6 wt. % |
| Carbon | 0-0.07 wt. % |
| Sulfur | 0.005-0.03 wt. % |
| Chromium | 0.01-1.5 wt. % |
| Zirconium | 0-1.5 wt. % |
| Titanium | 0-2.0 wt. % |
| Iron | balance |

In yet another embodiment, the nickel-iron alloy has the following composition:

| Elements | Wt. % |
| --- | --- |
| Nickel | 31-37 wt. % |
| Cobalt | 0-5.75 wt. % |
| Silicon | 0.07-0.28 wt. % |
| Aluminum | 0.06-0.6 wt. % |
| Copper | 0-0.09 wt. % |
| Manganese | 0.35-0.55 wt. % |
| Carbon | 0-0.06 wt. % |
| Sulfur | 0.01-0.02 wt. % |
| Chromium | 0.02-1.3 wt. % |
| Zirconium | 0-1.0 wt. % |
| Titanium | 0-1.0 wt. % |
| Iron | balance |

In yet another embodiment, the nickel-iron alloy has the following composition:

| Elements | Wt. % |
| --- | --- |
| Nickel | 36 wt. % |
| Silicon | 0.25 wt. % |
| Aluminum | 0.3 wt. % |
| Manganese | 0.5 wt. % |
| Sulfur | 0.02 wt. % |
| Chromium | 0.7 wt. % |
| Zirconium | 0.8 wt. % |
| Titanium | 0.5 wt. % |
| Iron | balance |

In yet another embodiment, the nickel-iron alloy has the following composition:

| Elements | Wt. % |
| --- | --- |
| Nickel | 36 wt. % |
| Silicon | 0.25 wt. % |
| Aluminum | 0.5 wt. % |
| Manganese | 0.5 wt. % |
| Sulfur | 0.02 wt. % |
| Chromium | 0.8 wt. % |
| Iron | balance |

In other embodiments, an optional pre-treatment step can be done prior to the ion nitriding to increase the amount of aluminum in the surface area of the mold tool. In this embodiment, the mold tool 20 can undergo aluminization prior to ion nitriding. Aluminizing is well known and as such will only be generally described here. Generally, aluminizing is a high temperature chemical process whereby aluminum vapors diffuse into the surface of the base metal forming new metallurgical aluminized alloys. The aluminide alloys formed at the surface can contain up to 20% aluminum. Also, aluminizing can be performed by hot dipping. While the tool may be aluminized in any suitable manner, in one embodiment, the tool is exposed to vapor diffusion of aluminum on the surface of the tool. With the amount of available aluminum for nitriding increased via the aluminum process, the resulting ion nitrided tool 20 will have a higher surface hardness than those similarity treated but having lesser amounts of aluminum. In these embodiments, the surface harness will be 500 to 2,000 HK and in other embodiments 600 to 1,500 HK and in yet other embodiments 700 to 1,000 HK.

Figure 3:
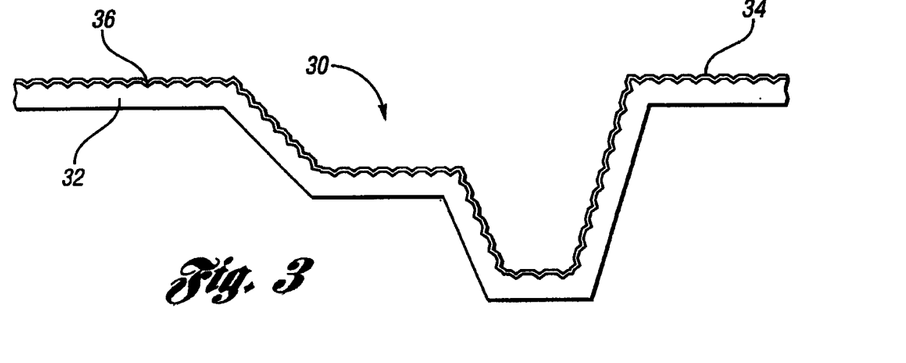
FIG. 3 is a view similar to FIG. 2 illustrating yet another embodiment of the present invention.

Referring to FIG. 3, a tool 30 is provided having a coating. This embodiment differs from the embodiment described and illustrated with respect to FIG. 2 in that the tool 30 is not surface treated but instead has a surface coating 34 deposited on top of the upper mold surface to create a new top surface of the tool. For instance, the characteristics of the body 32 in FIG. 3 is similar to that of body 22 in FIG. 2. Typically, when the surface coating 34 is provided, the grain 36 will be deeper than those in which the surface is case hardened or diffusion hardened. In this instance, the surface grain texture may be at least 200 microns. In the embodiment illustrated in FIG. 3, the coating 34 has a thickness of 0.1 to 25 microns, and in other embodiments 0.5 to 12 microns, and in other embodiments 1 to 5 microns and in yet other embodiments of 3 to 4 microns. While the molding tool 30 can have any suitable thickness, in certain embodiments the mold tool 30 will have an average thickness of 3 to 10 mm and in other embodiments of 3.5 to 4.5 mm with the body portion 32 comprising the majority of the thickness. In one embodiment, the molding tool 30 has a substantially uniform thickness, wherein uniform means that no portion of the tool has a thickness that varies by more than 0.1 mm from any other portion of the tool.

The coating 34 can be any suitable coating and provided in any suitable manner such that the resulting coating has a microhardness of 350 to 9,000 HK, in yet other embodiments 500 to 4,000 HK, in yet other embodiments 600 to 2,000 HK, and in yet other embodiments 700 to 1,500 HK. The coatings 34 can be provided in any suitable process such as electroplating, electroless plating, physical vapor deposition (PVD), or chemical vapor deposition (CVD). While any suitable coating can be provided, examples of suitable coatings include aluminum nitride, zirconium nitride, silicon nitride, titanium nitride and chromium nitride. The surface coatings 34 can also be in addition to metal, ceramic or high temperature polymers or combinations of these coatings. Metallic and ceramic coatings containing nickel, chromium, titanium, aluminum and other metals and alloys can be used to protect and seal the shell as well as improved mold release properties. Certain coatings, such as electroplating, range in thickness from 1 to 500 microns, in other embodiments from 5 to 200 microns, and in yet other embodiments 10 to 100 microns.

Figure 4A:
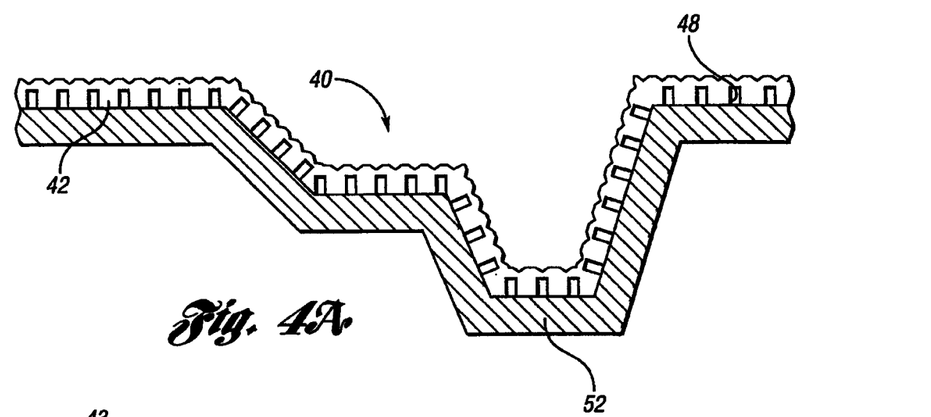
FIG. 4A is a view similar to FIG. 1 illustrating still yet another embodiment of the present invention.

Referring to FIG. 4A, a mold tool 40 is provided comprising a shell 42 having a schematically illustrated reinforcing element 52 and generally rectangular shaped heating/cooling elements cut or cast therein as schematically illustrated by 48. However, it should be understood that heating/cooling elements 48 can have any suitable shape.

Figure 4B:
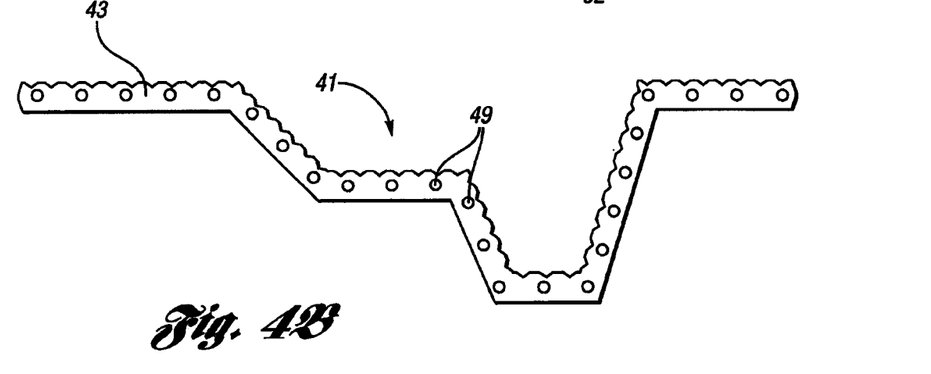
FIG. 4B is a view similar to FIG. 1 illustrating still yet another embodiment of the present invention.

Referring to FIG. 4B, a mold tool 41, similar to that shown and described with respect to FIG. 1, is provided. The mold tool 41 comprises a shell 43 having generally circular shaped heating/cooling elements cut or cast therein as schematically illustrated by 49. However, it should be understood that heating/cooling elements 49 can have any suitable shape.

Elements for controlling temperatures such as channel, grooves and fins for heating and cooling can be incorporated into the mold either during the forming process by casting them in (FIG. 4B) or after the mold has been formed by machining, welding, soldering, or brazing them to the back of the shell (FIG. 4A) to improve efficiency.

Figure 5:
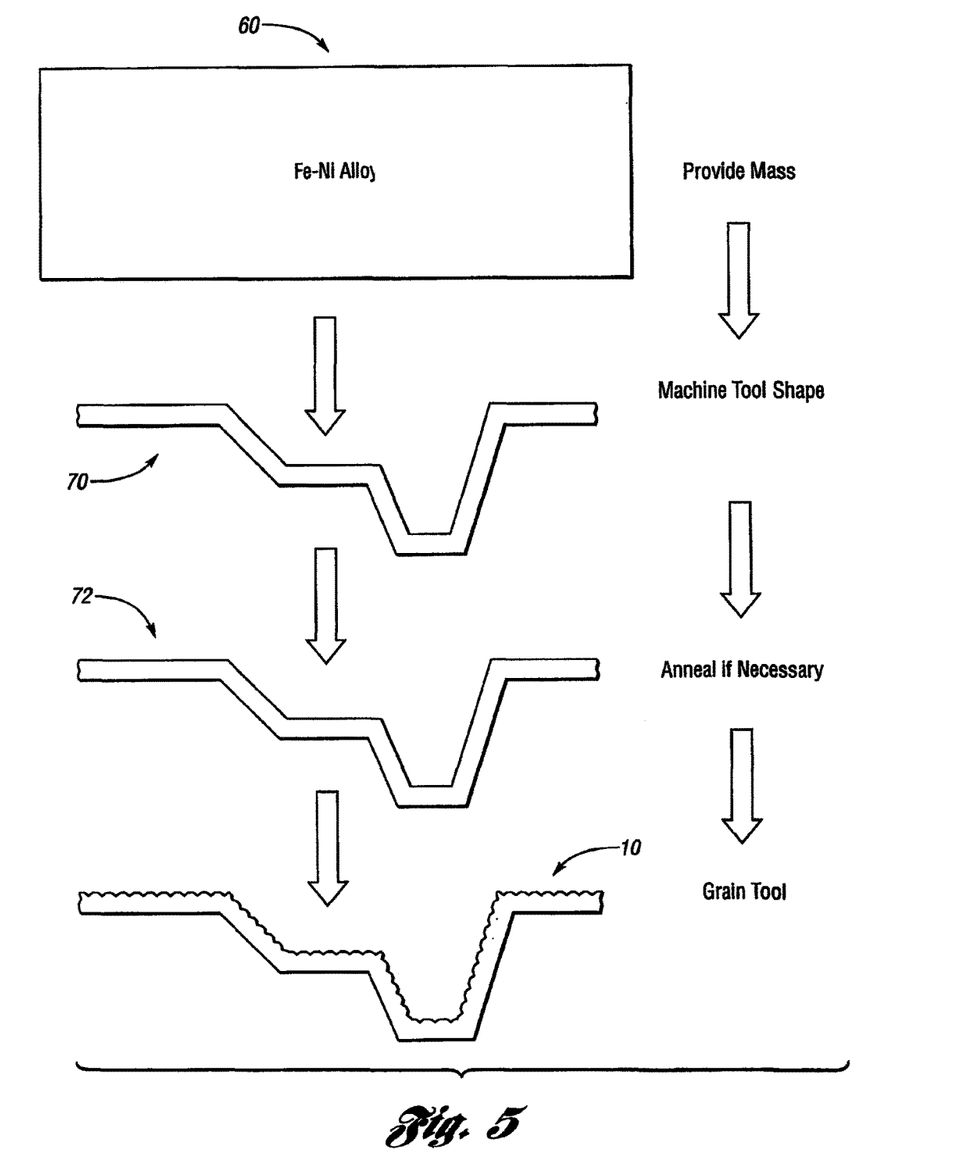
FIG. 5 is a flow chart illustrating an exemplary technique for making one embodiment of the present invention.

Referring to FIG. 5, an embodiment for making the molding tool is illustrated. A mass of iron nickel alloy 60 is provided. The alloy can then be machined or cast to shape 70. While any suitable shaping technique can be used, two suitable techniques are CNC cutting and electrical discharge machining (EDM). CNC cutting is well known and generally comprises cutting the metal to the desired shape and geometry. CNC EDM is also well known, and generally comprises removing metal by burning it away with electrical discharge.

Another technique for making the molding tool is to cast the material to a near net shape. After casting, CNC machining can be used to further modify the shape of the tool to the desired geometry and size. After the tool has been shaped, the tool may undergo an optional annealing step 72. After optional annealing, the CTE of the material will be stabilized or improved.

Lastly, the tool has grain provided on the upper mold surface. The graining can be provided in any suitable manner such as by acid etching, laser etching, or mechanical etching. The graining will typically have a depth of 5 to 1,000 microns, in other embodiments of 50 to 600 microns, and in yet other embodiments of 100 to 400 microns.

Figure 6:
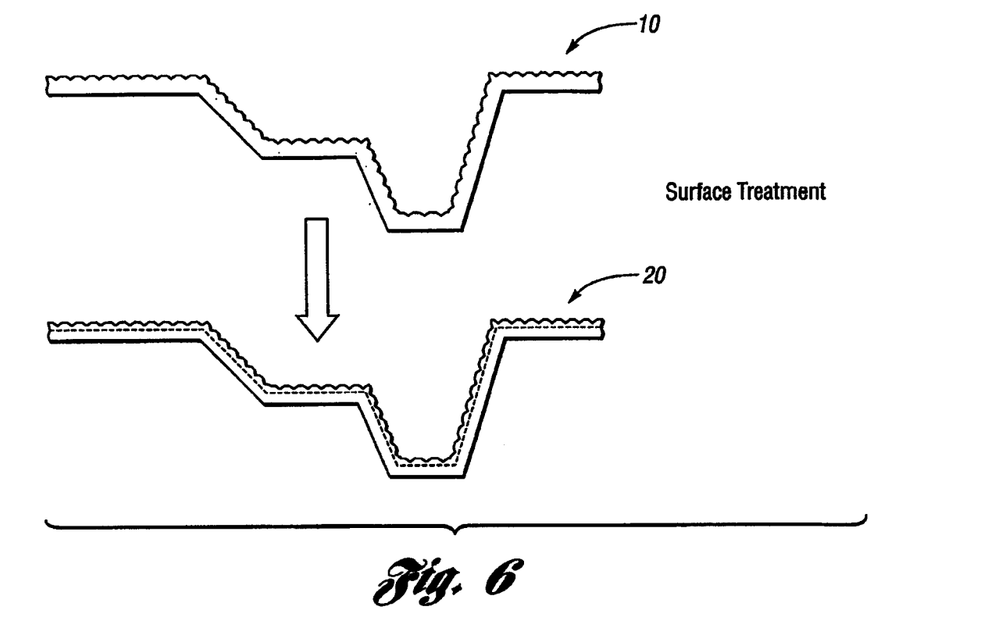
FIG. 6 is a flow chart illustrating the manufacture of yet another embodiment of the present invention.

Referring to FIG. 6, after the tool 10 has been formed, the tool can undergo surface treatment as discussed above wherein the surface is either nitrided or aluminized and then nitrided.

Figure 7:
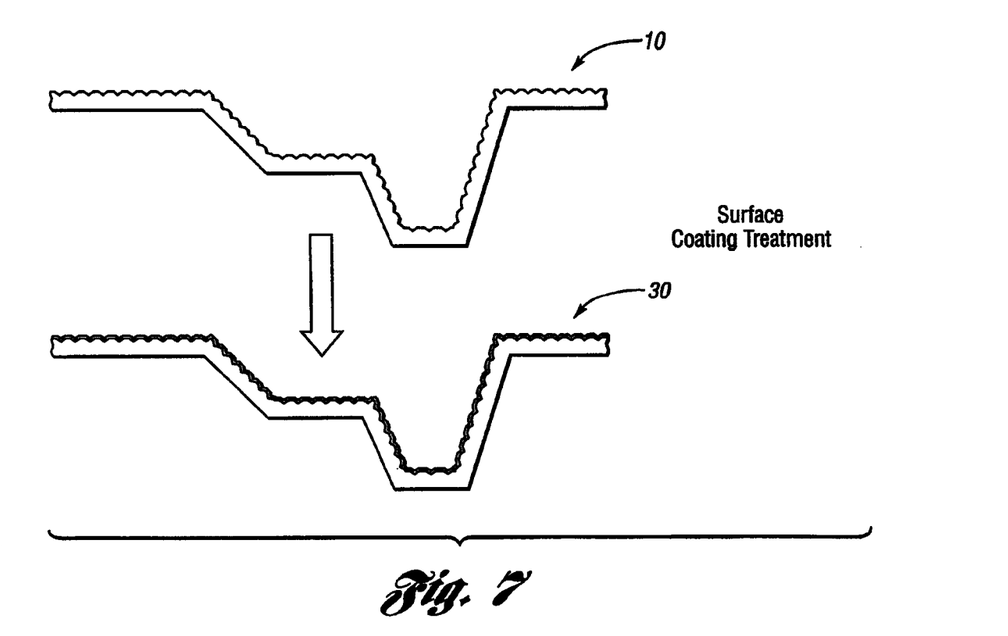
FIG. 7 is similar to FIG. 6 illustrating yet another embodiment of the present invention.

Referring to FIG. 7, the tool 10 after being manufactured can then be coated as described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rotomolding tool having a textured surface, the tool comprising:
   a shell having a body portion and an upper mold surface having a grain texture with a depth of 0.005 to 1.0 mm, at least the body portion comprising a nickel iron alloy, wherein the nickel iron alloy comprises:
   nickel in an amount ranging from 30 wt. % to 38 wt. %;
   up to 6.0 wt. % of one or more elements selected from the group consisting of cobalt, silicon, aluminum, copper, manganese, sulfur, chromium, zirconium, and titanium;
   from 0 wt. % to 0.07 wt. % carbon; and
   iron being the balance;
   provided that the nickel iron alloy comprises at least one of:
   aluminum in an amount of at least 0.3 wt %;
   copper;
   chromium in an amount of at least 0.7 wt %;
   zirconium in an amount of at least 0.8 wt %; or
   titanium in an amount of at least 0.5 wt %;
   wherein the upper mold surface has undergone a nitriding treatment.

2. The tool of claim 1, wherein the nickel iron alloy has a composition comprising at least 0.05 wt. % aluminum, and 0.01 wt. % chromium.

3. The tool of claim 1, wherein the nickel iron alloy has a composition comprising at least 0.05 to 0.75 wt. % aluminum, and 0.01 to 1.5 wt. % chromium.

4. The tool of claim 1, wherein the body portion has a first hardness having a Vickers hardness (HV) of at least 100 and the upper surface has a second hardness that is higher than the first hardness and a thickness of at most 1.5 mm.

5. The tool of claim 4, wherein the first hardness is 100 to 350 HV and the second hardness is a microhardness of 500 to 2,000 Knoop hardness (HK).

6. The tool of claim 1, wherein the upper mold surface comprises a nickel iron alloy that has undergone an aluminizing treatment prior to the nitriding treatment.

7. The tool of claim 1, wherein the nickel iron alloy has a coefficient of thermal expansion of $0.18 \times 10^{-6}$ m/m/° C.

(0.1×10⁻⁶ in/in/° F.) to 7.2×10⁻⁶ m/m/° C. (4.0×10⁻⁶ in/in/° F.) at temperatures between 37.7° C. (100° F.) and 260° C. (500° F.).

8. The tool of claim 1, wherein the upper mold surface comprises a nitride coating.

9. The tool of claim 1, wherein the tool has a thickness of 3 to 10 mm.

10. The tool of claim 1, wherein the nickel iron alloy has a composition comprising at least 0.1 wt. % aluminum, and 0.25 wt. % chromium.

11. The tool of claim 1, wherein the nickel iron alloy has a composition comprising at least 0.1 wt. % aluminum, 0.1 wt. % zirconium, and 0.1 wt. % titanium.

12. The tool of claim 1, wherein the nickel iron alloy has a composition comprising zirconium.

13. The tool of claim 1, wherein the nickel iron alloy has a composition comprising 0-6.0 wt. % cobalt, 0.05-0.3 wt. % silicon, 0.05-0.2 wt. % aluminum, 0-0.1 wt. % copper, 0.3-0.6 wt. % manganese, 0-0.07 wt. % carbon, 0.005-0.03 wt. % sulfur, 0.01-0.4 wt. % chromium, 0-0.1 wt. % zirconium, and 0-0.1 wt. % titanium.

14. The tool of claim 1, wherein the nickel iron alloy has a composition comprising 0-6.0 wt. % cobalt, 0.05-0.3 wt. % silicon, 0.05-0.75 wt. % aluminum, 0-0.1 wt. % copper, 0.3-0.6 wt. % manganese, 0-0.07 wt. % carbon, 0.005-0.03 wt. % sulfur, 0.01-1.5 wt. % chromium, 0-1.5 wt. % zirconium, and 0-2.0 wt. % titanium.

15. The tool of claim 1, wherein the nitriding treatment comprises ion nitriding.

16. A rotomolding tool having a texture surface, the tool comprising:
a shell having a body portion and an upper mold surface having a grain texture having a depth of 0.005 to 1.0 mm in the upper mold surface, at least the body portion comprising a nickel iron alloy, the nickel iron alloy having a composition comprising nickel in an amount ranging from 30 wt. % to 38 wt. %, 0.05 to 0.75 wt. % aluminum, 0.01 to 1.5 wt. % chromium, up to 6.0 wt. % of one or more elements selected from the group consisting of cobalt, silicon, copper, manganese, sulfur, zirconium, and titanium, from 0 wt. % to 0.07 wt. % carbon, and iron being the balance, provided that the nickel iron alloy comprises at least one of: aluminum in an amount of at least 0.3 wt %, copper, chromium in an amount of at least 0.7 wt %, zirconium in an amount of at least 0.8 wt %, or titanium in an amount of at least 0.5 wt %; the body portion having a second hardness that is higher than the first hardness with the tool having a thickness of 3 to 10 mm, wherein the upper mold surface has undergone a nitriding treatment.

17. The tool of claim 16, wherein the nickel iron alloy has a composition comprising zirconium in the amount of at least 0.1 wt. %.

18. The tool of claim 16, wherein the nitriding treatment comprises ion nitriding.

* * * * *